3,383,819
SKIRTING MEANS
Ernest C. Zimmer and Raymond W. Sickler, both of
R.D. 2, Wellsburg, N.Y. 14894
Filed Aug. 11, 1966, Ser. No. 571,815
2 Claims. (Cl. 52—483)

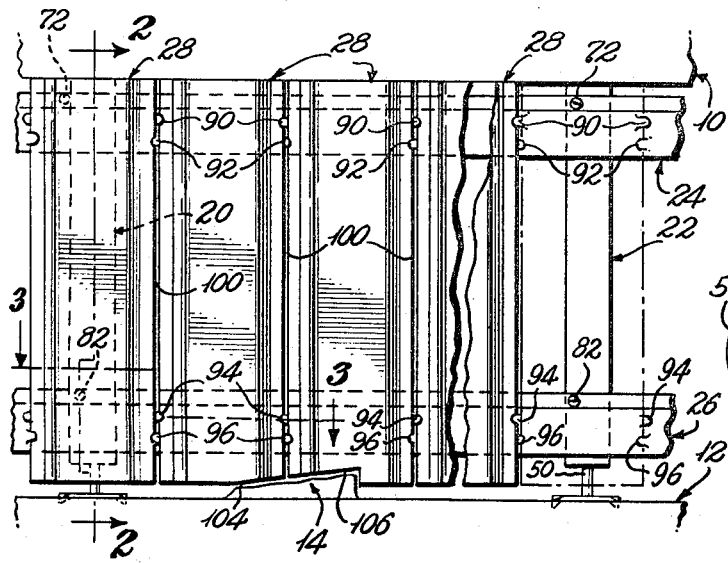
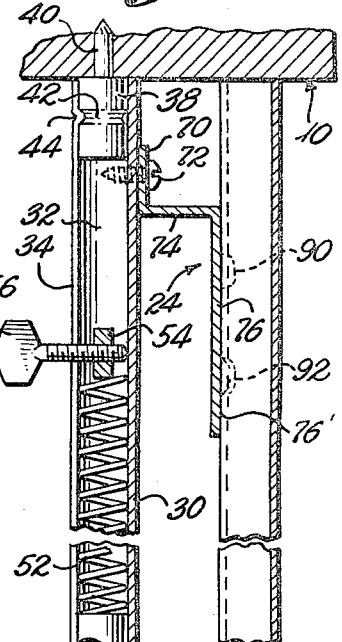
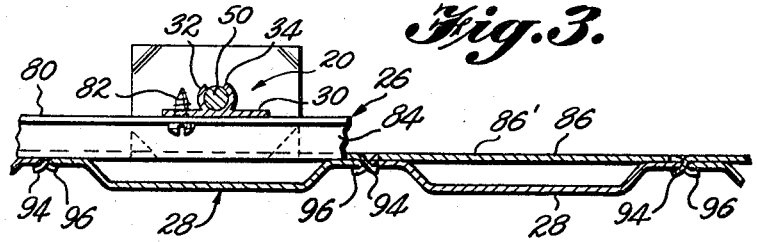
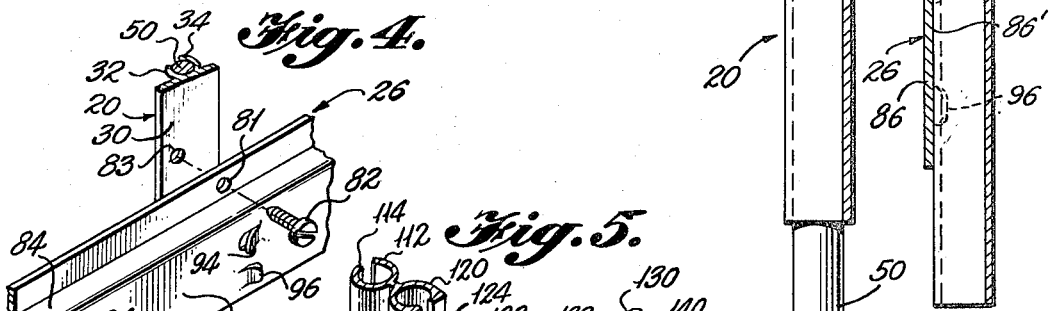
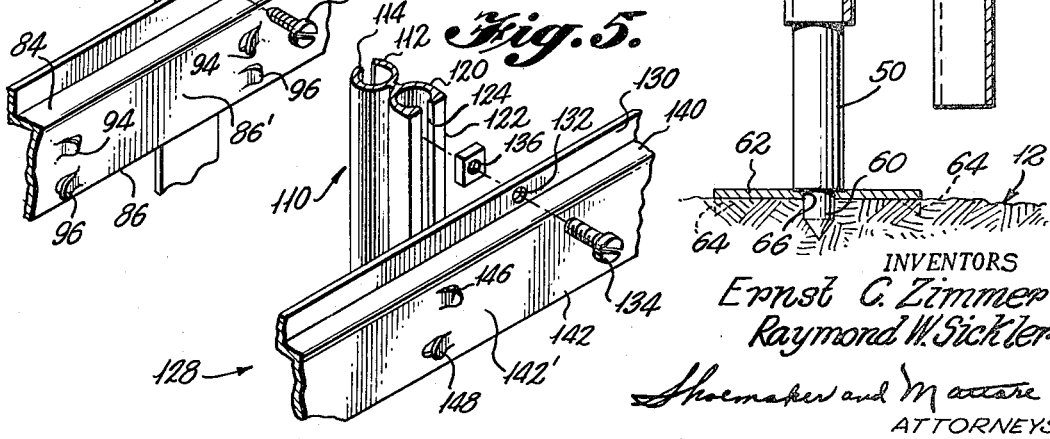

ABSTRACT OF THE DISCLOSURE

The stringers of a skirting device for a mobile home are provided with offset flanges and means securing them to the flanges of spaced posts. A flat face of the stringers carry pairs of vertically aligned tabs, with the tabs of each pair projecting horizontally and in opposite directions. The tabs receive and secure the edges of vertically extending flexible panels. The posts have controlled spring tensioned means adjusting their length.

The present invention relates to new and novel skirting means, and more particularly to skirting means as used with mobile homes when such mobile homes are immobilized and are mounted at an elevation above the ground surface to serve as living quarters.

When a mobile home or a house trailer is parked and used as a semi-permanent residence, the bottom of the structure is normally supported in spaced relationship to the surface of the ground since contact with the ground provides undesirable chemical corrosion to the bottom of the structure, and furthermore, there is a possibility that the trailer structure will be physically damaged due to changes in the contour of the gound as caused for example by heaving of the earth due to frost.

This spacing of the bottom of the trailer structure from the ground provides an unsightly appearance to the trailer and furthermore enables drafts of air to pass beneath the trailer which tends to cause the floor of the structure to be warmer in the summer and colder in the winter, which is of course a very undesirable feature.

The present invention provides a skirting means for enclosing the space between the ground and the bottom of a mobile home, this enclosing means providing a pleasing appearance, while allowing a certain amount of ventilation beneath the mobile home and at the same time effectively shielding this space from execessive drafts. The skirting means of the present invention is also self-adjusting so that it accommodates different heights initially between the trailer structure and the ground and further will allow a certain amount of relative movement after the structure is assembled. In this manner, the skirting means of the present invention may be installed over uneven ground and where there are slopes in the ground, and further it will automatically compensate for heaving of the ground due to frost and the like.

An important feature of the present invention is the fact that it may be quickly and easily installed particularly in view of the fact that the skirting means is generally erected by a trailer owner with no special tools or experience. In certain prior art arrangements, the skirt panels have been disposed in a horizontal array, whereas in the present invention the skirt panels are disposed substantially vertically. This vertical arrangement enables the panels to be snapped into operative position even more quickly and easily than with prior art snap-in arrangements, and there is no overlap of the skirt panels in the present invention thereby facilitating both assembly and disassembly of the skirting when desired.

A further feature of the vertical array of panels in the present invention is the fact that the skirting is readily adaptable to irregular supporting surfaces. If certain obstructions present themselves at the lower portion of the skirting, it is a simple matter to cut the lower ends of the individual panels to accommodate such obstruction, and in this manner, the lower edge portions of the skirting are adapted to conform to the configuration of the undersurface in a most simple and effective manner.

The skirting structure also is of a construction which enables corners and door openings and the like to be readily made as necessary. The skirt panels are spaced from one another a relatively small amount so as to provide adequate ventilation and air circulation beneath the trailer and at the same time these openings are of such a dimension as to prevent any substantial drafts from flowing beneath the structure. This results in the floors of the trailer being warmer in the winter-time and cooler in the summer.

In the present invention, the post means may be readily installed in position and then manually adjusted to provide the desired degree of tension to hold them in place. After this initial installation, the post means is self-adjusting. Stringer means are supported between adjacent post means, these stringer means having support means thereon which enable the individual skirt panels to be readily snapped into operative position in a quick and easy manner. The skirt panels are locked in this operative position without the need of providing any extra fasteners or the like, and the panels are held rigidly in position so that no wind rattle will occur after installation.

In a modified form of the invention, the stringer means which supports the individual skirt panels is vertically adjustable so as to permit ready adjustment of these stringers in a vertical direction as required at any particular installation.

The primary object of the present invention is to provide new and novel skirting means as used with mobile homes which may be readily installed in a quicker and easier manner than prior art arrangements and wherein there is no requirement for overlap of individual panels thereby simplifying installation and disassembly as well as minimizing the amount of material required.

Another object of the invention is the provision of skirting means which is readily adjustable for different heights between a supporting surface and a moble home structure thereabove and which automatically compensates for uneven ground and slopes therein as well as compensating for heaving of the ground which may occur due to frost.

Still another object of the invention is to provide skirting means wherein the lower edge portions thereof may be readily cut to conform to any obstructions therebeneath.

Yet another object of the invention is to provide skirting means of such construction that it is relatively easy to make corner structures required as well as door openings and the like.

Yet another object of the invention is to provide skirting means providing certain desirable spaces between adjacent skirt panels to permit air circulation and which at the same time prevent excessive drafts beneath the floor of the trailer to thereby enable the floors of the trailer to be warmer in the winter and cooler in the summer.

A still further object of the invention is to provide skirting means wherein the skirt panels may be simply snapped into place without requiring extra fastener means and wherein the skirt panels will be securely locked in position to prevent any wind rattle after installation.

Still another object of the invention is to provide skirting means wherein the support means for the individual skirt panels may be readily adjusted in a vertical direction.

Yet another object of the invention is the provision of skirting means which is quite simple and inexpensive in construction and yet which at the same time is quite sturdy and reliable in operation.

Other objects and many attendant advantages of the invention will become more apparent when considered in connection with the specification and accompanying drawing, wherein:

FIG. 1 is a front elevation of skirting means according to the present invention;

FIG. 2 is a sectional view taken substantially along line 2—2 of FIG. 1 looking in the direction of the arrows;

FIG. 3 is a sectional view taken substantially along line 3—3 of FIG. 1 looking in the direction of the arrows;

FIG. 4 is a top perspective view of a broken-away portion of a post means and associated stringer member illustrating the details of construction thereof; and FIG. 5 is similar to FIG. 4 but showing a modified post.

Referring now to the drawings wherein like reference characters designate corresponding parts throughout the several views, a portion of a mobile home or trailer is indicated generally by reference numeral 10, and an underlying space supporting surface is indicated generally by reference numeral 12, this supporting surface 12 as seen in FIG. 1 having an obstruction 14 extending upwardly therefrom. It will be understood that the trailer structure is normally supported in spaced relationship to the ground by suitable cement blocks or the like.

The skirting means of the present invention includes a pair of generally vertically extending post means 20 and 22 as seen most clearly in FIG. 1, it being understood that any number of such spaced post means may be provided as required. Post means 20 and 22 serve to support substantially horizontally extending upper and lower stringer members 24 and 26 respectively, these stringer members in turn supporting a plurality of generally vertically extending parallel individual skirt panels 28, four of such panels being illustrated as in mounted operative position in FIG. 1.

Referring now particularly to FIGS. 2 and 3, the details of construction of post means 20 may be more clearly understood. This post means includes an upper portion 30 comprising an extrusion having an integral generally cylindrical portion 32 extending from one side thereof which may be considered the rear face of the post means. This cylindrical portion is provided with the longitudinally extending slot 34 throughout the length thereof. Means for engaging the structure at the upper end of the post means includes a generally cylindrical member 38 having a reduced outer end portion 40 which may be provided with a point at the outer end thereof, this reduced end portion being received in a suitable hole formed in the trailer structure 10. This hole may be drilled in the structure or the sharp pointed end 40 may simply be moved into a softer material if desired. Portion 38 is provided with a peripheral groove 42 in the outer surface thereof, and a portion 44 of member 32 is crimped as indicated into the groove 42 so as to secure member 38 in the operative position shown.

The lower portion of the post means includes a rod-like member 50 which is slidably received within the lower part of portion 32 of the upper portion of the post means. A compression spring 52 is disposed within portion 32 and engages the upper end of member 50. The upper end of spring 52 is in engagement with a nut member 54 which is relatively snugly received within portion 32 and which further has a thumbscrew 56 threaded therethrough. It is apparent that thumbscrew 56 serves as a means for locking the nut 54 in any particular position within the portion 32 of the post means, and in this manner the nut 54 can be moved to different positions within portion 32 to adjust the amount of spring force applied to member 50.

The lower end of rod-like member 50 is provided with a reduced end portion 60 which terminates in a sharpened point. A base plate 62 is provided wherein the four corners 64 thereof are bent downwardly to provide four sharpened corner portions adapted to dig into a supporting surface. The reduced end portion 60 is loosely received within a central hole 66 formed in plate 62 to provide a limited universal interconnection therebetween to allow a certain amount of relative movement between the base plate and member 50. This will permit the base plate to adjust to the slope of the underlying support surface while the member 50 and the post means may remain in a generally vertical position.

The upper stringer member 24 includes a first generally vertical portion 70 having suitable holes therein for receiving metal screws 72 which extend through corresponding holes provided in the portion 30 of the post means for securing the stringer member in operative position between a pair of adjacent post means. Stringer member 24 includes an integral generally horizontally extending portion 74 which in turn joins with an integral generally vertically extending portion 76 defining a forward face 76'.

The lower stringer member 26 includes a generally vertically extending portion 80 having suitable holes such as 81 as seen in FIG. 4 formed therethrough for receiving metal screws 82 which in turn extend through aligned holes such as hole 83 as seen in FIG. 4 for securing the stringer member between a pair of adjacent post means. Stringer member 26 also includes an integral generally horizontally extending portion 84 which joins with an integral generally vertically extending portion 86 defining a forward face 86'.

The support means includes a plurality of integral tabs punched out of the material of the upper and lower stringer members and extending outwardly from the flat outer faces of the two stringer members, the skirt panels being adapted to fit up against these outer faces which are aligned to define a plane.

The support means formed on the stringer members 24 comprises a first horizontal row of integral punched-out tabs 90 and a second horizontal row of integral punched-out tabs 92. In a similar manner, the lower stringer member 26 is provided with a first horizontal row of punched-out integral tabs 94 and a second horizontal row of punched-out integral tabs 96. In each case, the tabs are formed in the vertically extending portions 76 and 86 of the two stringer members and extend outwardly from the forward faces thereof. Each tab is disposed at an acute angle to the associated forward face of the stringer member.

As can be seen most clearly in FIGS. 3 and 4, adjacent ones of the tabs in each horizontal row are disposed such that a pair of such tabs converge outwardly away from the outer face of the associated stringer members so that these outwardly converging tabs are adapted to receive opposite side edges of an associated skirt panel. As seen especially in FIG. 3, it will be noted that the skirt panels are of generally channel-shaped configuration, and are formed of a suitable flexible material such as aluminum or the like which is sufficiently flexible to permit the individual panels to be snapped into the position shown with the support tabs overlapping the opposite side edges of the associated panels.

It is evident as seen in FIG. 1 that a first panel 28 may be supported by a pair of upper tabs 90 and 94, while the adjacent skirt panel is supported by a pair of lower tabs 92 and 96 on the respective stringer members. When mounting the panels in operative position, it is merely necessary to grasp the opposite side edges of the panels and to deform them slightly so that they can be snapped into the position shown, whereupon when the panels are released, the natural resilience thereof will cause them to snap into and be locked in the operative position.

It will also be noted that when the panels are in the operative position seen in FIG. 1, a narrow space indicated by reference numeral 100 is provided between the side edges of adjacent panels.

When assembling the structure of the present invention, the upper and lower portions of the post means are first assembled as illustrated in FIG. 2 and the thumbscrew 56 and nut 54 are set in the approximate finished location to provide the desired spring force. The upper end portion 40 is positioned within a suitable hole provided in the trailer, and the base plate rests upon the supporting surface or ground. Nut 54 may then be adjusted to provide the particular spring force desired. The post means are spaced at suitable points about the perimeter of the trailer, and the stringer members 24 and 26 are then supported in position, these stringer members being of any suitable length.

The panels are then snapped into place behind the supporting tabs and these steps repeated until it is desired to locate a door or the like whereupon a suitable opening can be provided in the panels with a post means at either side of such opening, and with the stringer members terminating at such point. Corners may be formed simply by securing a corner trim member of generally L-shaped cross section to panels provided at a corner area.

When an obstruction such as 14 is encountered, suitable cutout portions such as 104 and 106 may be provided at the lower ends of certain skirt panels so as to provide the desired clearance with such obstruction. This can be done in a simple manner with a pair of tin snips or the like.

In the completed installation, a space of approximately ⅛ inch in width may be provided between the side edges of adjacent panels to allow enough air circulation for the furnace of a trailer and to prevent mildew from forming thereunder.

Referring now particularly to FIG. 5 of the drawing, a modification of the invention is illustrated including a post means indicated generally by reference numeral 110. This post means includes an upper portion comprising an extrusion having an integral generally cylindrical portion 112 extending from one side thereof which may be considered the rear face of the post means. This cylindrical portion is provided with a longitudinally extending slot 34 throughout the length thereof and corresponds to the cylindrical portion 32 previously described. It should be understood that means is provided at the upper end of this cylindrical portion for engaging the structure at the upper end of the post, and that suitable components will be associated with the lower end of portion 112 for providing the self-adjusting feature of the post means.

This extrusion also includes a generally cylindrical portion 120 including a flat surface 122 defining the forward face of the post means, a longitudinally extending slot 124 being formed throughout the length of this portion and extending from face 122 to the bore of the generally cylindrical portion 120.

In this form of the invention, stringer members 128 may be provided similar to the stringer members 24 and 26 previously described. Stringer member 128 includes a generally vertically extending portion 130 having suitable holes such as 132 formed therethrough for receiving bolts 134 which in turn extend through the slot 124 and are threaded into nuts 136 which are disposed within the bore formed in the portion 120 of the post means. In other words, nuts 136 are disposed within portions 120 similar to the manner in which nuts 54 previously described are disposed within portions 32.

Stringer member 128 also includes an integral generally horizontally extending portion 140 which joins with an integral generally vertically extending portion 142 defining a forward face 142'. The support means formed on portion 142 is similar to that previously described and comprises a first horizontal row of integral punched out tabs 146 and a second horizontal row of integral punched out tabs 148. A similar cooperating stringer member may be provided with like support means, the tabs all being disposed at an acute angle to the associated forward face of the stringer member.

It is apparent that the stringer member as shown in FIG. 5 may be readily vertically adjusted by loosening bolt 134 to move the stringer member into a desired position whereupon the bolt can be tightened to lock the stringer member in the desired operative relationship. The associated skirt panels may then be readily snapped into operative position as described hereinbefore.

It is apparent from the foregoing that there is provided according to the present invention new and novel skirting means especially adapted for use with mobile homes which can be readily installed in a quick and efficient manner, the skirting panels being disposed in a vertical array so as to permit quicker and easier installation than is the case with the horizontally disposed panels, and further wherein no overlap between adjacent panels is required thereby providing a saving in material. The horizontal position of the panels also permits the lower ends thereof to be readily cut away as required to clear obstructions in the underlying surface. This skirting is adjustable for different heights of a structure above a support surface and is adapted to accommodate uneven ground and sloping terrain as well as heaving of the ground due to frost or the like. With this construction, it is easy to form corners and door openings as required. The completed structure provides openings to enable desired air circulation which results in cutting down excessive drafts beneath the trailer structure and further which provides a completed structure of pleasing appearance. The individual skirt panels may be snapped into place whereupon they are firmly locked in position without the necessity of providing extra fasteners and are held securely in place so as to prevent any wind rattle. The apparatus is quite simple and inexpensive in construction, and yet at the same time is quite sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A skirting means for the space between a support surface and the structure above the support surface comprising a plurality of post means spaced from one another, stringer members supported by said post means in vertical spaced relation, said stringer members each including an elongated flat faced panel having an integral off-set flange extending along its upper edge and means securing said off-set flange to the post means, said stringer members including support means on said flat faced panel, and a plurality of separate skirt panels supported by said support means in substantially parallel relationship with one another with said panels extending substantially perpendicular to said stringer member, said support means including horizontally spaced pairs of horizontally extending tabs integral with said stringer panel and on the flat face thereof, the tabs of each pair being substantially vertically aligned and extending in opposite directions, said skirt panels being flexible and supported solely by said support means, said post means including flange means and manually controllable self adjusting spring means substantially enclosed in a channel extending longitudinally thereof and enabling the post means to be adjustable as to length, and said post flange means receiving said securing means of said off-set flange of said stringer panel, and manual adjusting means for controlling the amount of force exerted by said spring means.

2. Apparatus as defined in claim 1 including manual adjusting means for controlling the amount of force exerted by said resilient means.

References Cited

UNITED STATES PATENTS

| | | | |
|---|---|---|---|
| 2,520,314 | 8/1950 | Harris | 256—22 |
| 2,760,745 | 8/1956 | McCleery | 287—58 X |
| 2,766,967 | 10/1956 | Roberts | 256—22 |
| 2,855,037 | 10/1958 | Stiffel | 160—135 |
| 3,042,425 | 7/1962 | Cathey et al. | 280—150 X |
| 3,113,357 | 12/1963 | Reukauf et al. | 280—150 X |
| 3,218,091 | 11/1965 | Doak | 280—150 |
| 3,256,655 | 6/1966 | Teeter | 256—240 X |
| 3,343,326 | 9/1967 | Sickler et al. | 256—22 X |

DAVID J. WILLIAMOWSKY, *Primary Examiner.*

DENNIS L. TAYLOR, *Examiner.*